(12) United States Patent
Park (10) Patent No.: US 10,493,998 B2
(45) Date of Patent: Dec. 3, 2019

(54) METHOD AND SYSTEM FOR PROVIDING DRIVING GUIDANCE

(71) Applicants: Hyundai Motor Company, Seoul (KR); Kia Motors Corporation, Seoul (KR)

(72) Inventor: Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/982,135

(22) Filed: May 17, 2018

(65) Prior Publication Data

US 2018/0334176 A1 Nov. 22, 2018

(30) Foreign Application Priority Data

May 17, 2017 (KR) .................. 10-2017-0060954

(51) Int. Cl.
| | |
|---|---|
| *B60Q 1/00* | (2006.01) |
| *B60W 50/14* | (2012.01) |
| *B60W 40/09* | (2012.01) |
| *H04W 4/40* | (2018.01) |
| *B60W 40/04* | (2006.01) |
| *B60W 50/00* | (2006.01) |

(52) U.S. Cl.
CPC ............ *B60W 50/14* (2013.01); *B60W 40/04* (2013.01); *B60W 40/09* (2013.01); *H04W 4/40* (2018.02); *B60W 2050/0089* (2013.01); *B60W 2050/146* (2013.01)

(58) Field of Classification Search
None
See application file for complete search history.

(56) References Cited

U.S. PATENT DOCUMENTS

| | | | |
|---|---|---|---|
| 9,805,601 B1* | 10/2017 | Fields | G08G 1/096791 |
| 2014/0309920 A1* | 10/2014 | Ricci | H04W 4/21 |
| | | | 701/400 |
| 2014/0309927 A1* | 10/2014 | Ricci | B60Q 1/00 |
| | | | 701/424 |
| 2015/0149071 A1* | 5/2015 | Uno | G08G 1/09626 |
| | | | 701/408 |
| 2016/0284217 A1* | 9/2016 | Lee | G08G 1/143 |
| 2016/0375769 A1* | 12/2016 | Shiota | B60K 35/00 |
| | | | 340/439 |
| 2017/0113686 A1* | 4/2017 | Horita | B60W 30/12 |
| 2017/0116854 A1* | 4/2017 | Sugawara | G01C 21/3492 |

* cited by examiner

*Primary Examiner* — Julie B Lieu
(74) *Attorney, Agent, or Firm* — Mintz Levin Cohn Ferris Glovsky and Popeo, P.C.; Peter F. Corless (57) ABSTRACT

A method for providing a driving in at a vehicle can include: recognizing, by a vehicle controller, driving conditions relating to a surrounding environment of the vehicle and a behavior of the vehicle using information obtained via one or more of a sensor and an electronic device; identifying, by the vehicle controller, a recommended pattern corresponding to the recognized driving conditions from among a plurality of previously classified patterns; outputting, by the vehicle controller, feedback information corresponding to the identified recommended pattern; and transmitting, by the vehicle controller, information relating to the identified recommended pattern.

18 Claims, 7 Drawing Sheets

METHOD AND SYSTEM FOR PROVIDING DRIVING GUIDANCE

CROSS-REFERENCE TO RELATED APPLICATION

Pursuant to 35 U.S.C. § 119(a), this application claims the benefit of earlier filing date and right of priority to Korean Application No. 10-2017-0060954, filed on May 17, 2017 in the Korean Intellectual Property Office, the contents of which are hereby incorporated by reference herein in their entirety.

BACKGROUND OF THE DISCLOSURE

Technical Field

The present disclosure relates to a method and system for providing driving guide information to a driver, and more particularly, a method for feeding back guide information for desirable driving to a driver by evaluating responses of the driver to driving conditions and utilizing evaluation information and a system therefor.

Discussion of the Related Art

As increasing numbers of electronic devices have been installed in vehicles in recent years, drivers are now provided with a variety of information related to driving conditions, while some electronic devices are also directly involved in driving. For example, an advanced driver assistance system (ADAS) can provide warning information about blind spots to drivers, and automatic steering control can prevent lane departure without drivers' steering wheel control.

Further, certain electronic devices enable autonomous driving through driving condition recognition using artificial intelligence and the like. Moreover, sharing large amounts of information has been enabled through vehicle-to-everything (V2X) communication.

However, aside from the advance of such technologies, legal and moral issues related to responsibility for autonomous driving remain. In an environment where autonomous driving vehicles exist with other vehicles, drivers are still expected to be the most important subject in driving control.

Thus, in order to create a safer driving environment, it is necessary to improve drivers' driving capabilities and develop driving assistance systems using electronic devices. It is also desirable that drivers improve their driving attitudes. To this end, an anticipative, intelligent, continuous and available approach, which is similar to correcting drivers' mistakes, is needed rather than one-time warnings or education.

SUMMARY OF THE DISCLOSURE

Accordingly, the object of the present disclosure is to provide a method and system for providing driving guide information to a driver.

More particularly, the object of the present disclosure is to provide a method for feeding back guide information for desirable driving to a driver by evaluating responses of the driver to driving conditions and utilizing evaluation information in various ways and a system therefor.

It will be appreciated by persons skilled in the art that the objects that could be achieved with the present disclosure are not limited to what has been particularly described hereinabove. Other objects that the present disclosure could achieve will be more clearly understood from the following detailed description.

To achieve these objects and other advantages, according to embodiments of the present disclosure, a method for providing driving guidance in a vehicle can include: recognizing, by a vehicle controller, driving conditions relating to a surrounding environment of the vehicle and a behavior of the vehicle using information obtained via one or more of a sensor and an electronic device; identifying, by the vehicle controller, a recommended pattern corresponding to the recognized driving conditions from among a plurality of previously classified patterns; outputting, by the vehicle controller, feedback information corresponding to the identified recommended pattern; and transmitting, by the vehicle controller, information relating to the identified recommended pattern.

Furthermore, according to embodiments of the present disclosure, a system for providing driving guidance can include: a vehicle equipped with a vehicle controller configured to recognize driving conditions relating to a surrounding environment of the vehicle and a behavior of the vehicle using information obtained via one or more of a sensor and an electronic device, identify a recommended pattern corresponding to the recognized driving conditions from among a plurality of previously classified patterns, and output feedback information corresponding to the identified recommended pattern; and a server configured to receive information relating to the identified recommended pattern from the vehicle and store the received information.

Furthermore, according to embodiments of the present disclosure, a an information recognition unit configured to obtain information relating to a surrounding environment of the vehicle and a behavior of the vehicle using information obtained via one or more of a sensor and an electronic device; a determination unit configured to recognize driving conditions using the information obtained by the information recognition unit and identify a recommended pattern corresponding to the recognized driving conditions from among a plurality of previously classified patterns; an output unit configured to output feedback information corresponding to the identified recommended pattern; and a wireless communication unit configured to transmit information relating to the identified recommended pattern.

Accordingly, the above-described vehicle system can provide various driving guide information to a driver. In particular, the vehicle system can provide positive feedback to the driver for considerate driving, thereby improving traffic culture and promoting safe driving.

It will be appreciated by persons skilled in the art that the effects that can be achieved through the present disclosure are not limited to what has been particularly described hereinabove, and other advantages of the present disclosure will be more clearly understood from the following detailed description.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Hereinafter, the embodiments of the present disclosure will be described in detail with reference to accompanying drawings to allow those having ordinary skill in the art to easily implement the embodiments. However, the present disclosure may be implemented in various forms and is not limited to the embodiments described herein. To clearly describe the present disclosure, parts that are not associated with the description are omitted from the drawings, and throughout the specification, identical reference numerals refer to identical parts.

Throughout the specification, when a certain portion "comprises" or "includes" a certain component, this indicates that the other components are not excluded and may be further included unless specially described otherwise. In addition, parts listed herein with the same reference number mean that they are the same components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one vehicle controller. The term "controller" may refer to a hardware device that includes a memory and a processor. The memory is configured to store program instructions, and the processor is specifically programmed to execute the program instructions to perform one or more processes which are described further below. The vehicle controller may control operation of units, modules, parts, or the like, as described herein. Moreover, it is understood that the below methods may be executed by an apparatus comprising the vehicle controller in conjunction with one or more other components, as would be appreciated by a person of ordinary skill in the art.

Referring now to embodiments of the present disclosure, provided are a method for recognizing driving conditions, evaluating responses of a driver by determining similarity between the recognized driving conditions and preconfigured recommended patterns, feeding back guide information for desirable driving to the driver, and using evaluation information in various ways and system therefor.

First, a basic concept of the embodiments of the present disclosure will be described with reference to FIG. 1.

Figure 1:
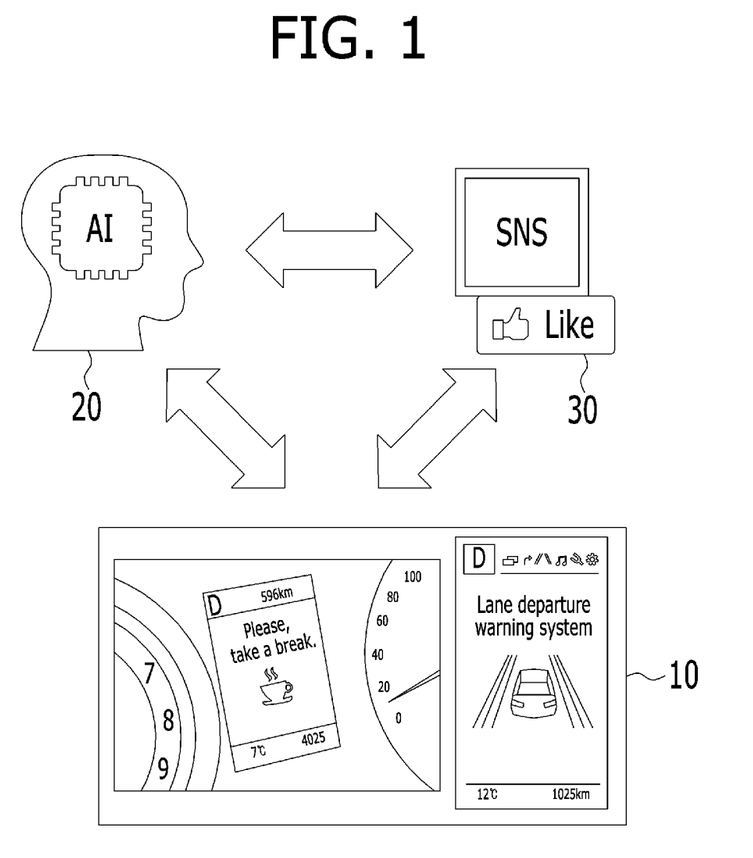
FIG. 1 is a diagram for explaining a basic concept of the present disclosure.

As shown in FIG. 1, the embodiments of the present disclosure are based on grafting of a driver assistance/information provision function 10 through various sensors mounted on the vehicle, artificial intelligence 20 for identifying the current situation and matching patterns, and an additional online service such as a social network service (SNS). That is, based on the artificial intelligence technology, the embodiments of the present disclosure can recognize whether a driver has desirable driving habits such as considerate driving and provide positive feedback to the driver in order to improve traffic culture and promote safe driving.

Figure 2:
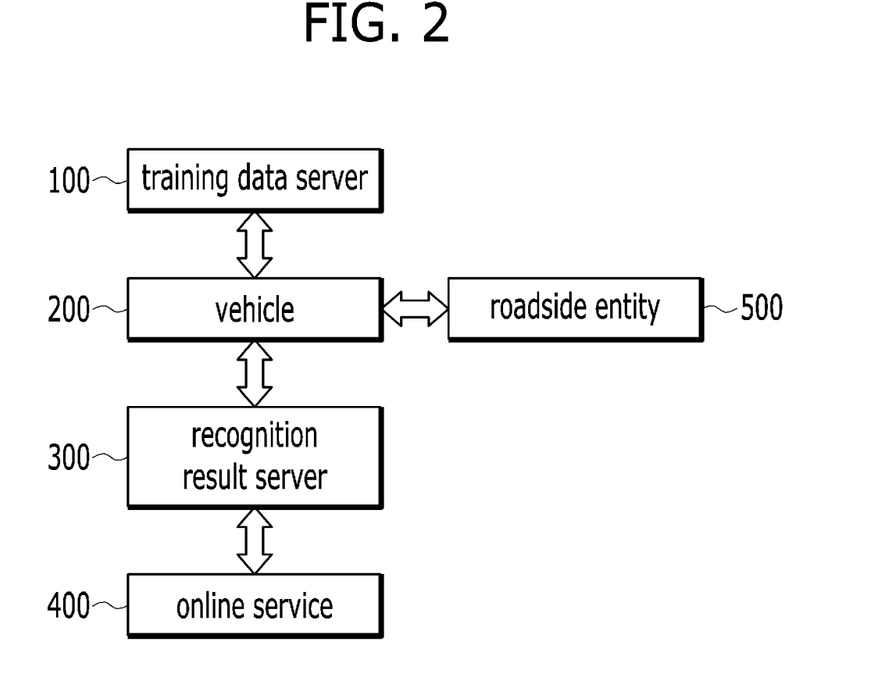
FIG. 2 illustrates an example of the configuration of a driving guide system applicable to embodiments of the present disclosure.

FIG. 2 illustrates an example of the configuration of a driving guide system applicable to embodiments of the present disclosure.

As shown in FIG. 2, the driving guide system applicable to the embodiments of the present disclosure may include a driving training data server 100 configured to identify a recommended pattern, a vehicle 200 configured to provide driving guide information to a driver, a recognition result server 300 configured to receive and store a result of identifying driving conditions recognized by the vehicle 200, an online service entity 400 configured to provide various additional functions by receiving data from the recognition result server 300, and a roadside entity 500 configured to provide information necessary for recognition and identification of driving conditions to the vehicle 200.

The configuration of the individual components except the roadside entity 500 will be described in detail later. The roadside entity 500 may include any entities that provide information necessary for recognition and identification of driving conditions to the vehicle 200 on or near a road according to a predetermined communication method (e.g., V2X, etc.). For example, the roadside entity 500 may be another vehicle on the road, an infrastructure installed on or near the road, a smart device carried by a pedestrian near the road. The smart device carried by the pedestrian should perform a discovery procedure or establish a data path to directly communicate with the vehicle but may have difficulties in doing so.

In this case, the smart device may be connected to a predetermined remote server so that it can provide data to the remote server and the remote server can provide the corresponding data to the vehicle. In this case, the data provided to the vehicle may include at least one of whether there is a pedestrian around the corresponding vehicle, pedestrian density, and pedestrian moving direction. However, this is merely an example, and the disclosure is not limited thereto. That is, any information related to the safety or care of pedestrians can be included.

It should be understood that components illustrated in FIG. 2 are merely exemplary, and the driving guide system may include more or fewer components. In addition, one component may include a plurality of sub-components, or at least one component may be configured to replace with another component.

Hereinafter, operation of each component will be described based on the above-described system configuration. For convenience of description, the operation process of each component will be divided into three phases, but the operation process is not limited thereto.

The three phases includes: an offline phase; an on-board phase; and an online phase. The offline phase may mean a procedure in which the training data server 100 trains an artificial intelligence recognition model to recognize driving conditions and determine similarity between recommended patterns through training of the recommended patterns identified based on various actual driving data and various considerate driving evaluation results. The on-board phase may mean a procedure in which the vehicle determines similarity between driving conditions that occur during actual driving and the recommended patterns, provides feedback based on the result to the driver, and provides the corresponding result to the recognition result server 300 (after processing the result) using the recognition model generated in the offline phase.

In addition, the online phase may mean a procedure for providing various incentives to the driver either directly or indirectly by transmitting information stored in the recognition result server 300 to various online service entities 400. In this case, since driver's response to the driving environment may include sensitive personal information or cause legal or moral disadvantages to the driver, the recognition result server 300 may be configured to provide information to the online service entity 400 within the range allowed by the driver.

First, the structure of the training data server for performing the online phase will be described in brief with reference to FIG. 3.

Figure 3:
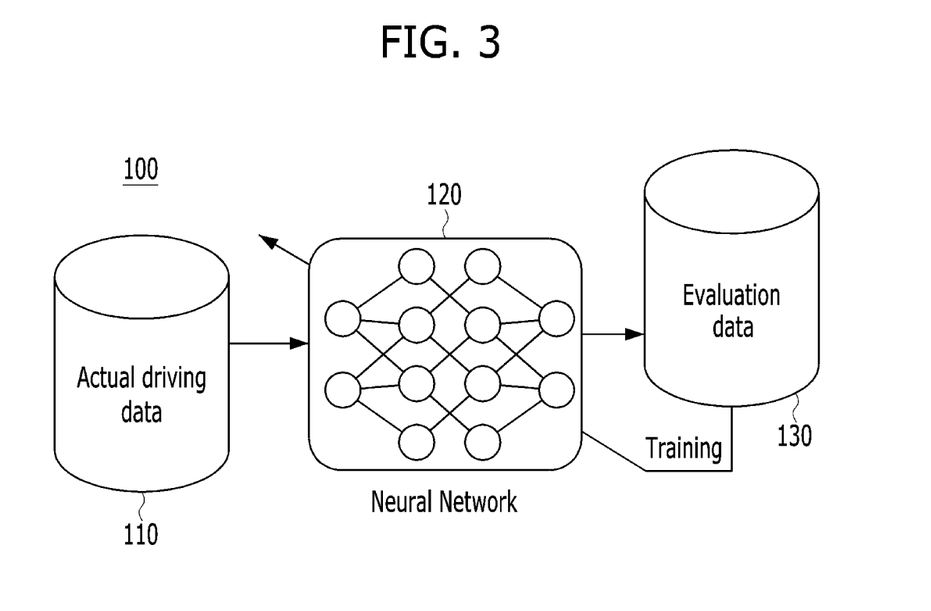
FIG. 3 illustrates an exemplary structure of a training data server according to embodiments of the present disclosure.

FIG. 3 illustrates an exemplary structure of a training data server according to embodiments of the present disclosure.

As shown in FIG. 3, the training data server 100 may include an actual driving data storage unit 110, a training unit 120, and an evaluation data storage unit 130.

The actual data storage unit 110 stores basic data for model training at the training unit 120 and provides the basic data to the training unit 120. The basic data may include actual driving data directly/indirectly collected in various ways such as telematics services, vehicles where sensors for collecting data are mounted, big data collected online, etc.

In addition, the evaluation data storage unit 130 stores evaluation data for model training at the training unit 120. In this case, the evaluation data may include a predetermined evaluation rule for each driving condition, a plurality of recommended patterns for each driving condition, information on the degree of consideration estimated by experts, etc.

Moreover, the evaluation data may include information having a different recommendation level per classified pattern after defining/classifying driving conditions as a plurality of patterns according to predetermined standards in advance. In this case, the pattern having a recommendation level higher than a predetermined reference value may be referred to as the recommended pattern. The reference of the recommendation level may include at least one of a rule set out in the traffic regulations, action of caring nearby vehicles and pedestrians although it is not set out in the traffic regulation, and action of promoting safety of the corresponding vehicle, other vehicles, and pedestrians may be used.

In this case, the actual driving data may include information on changes detected in the surrounding environment of the vehicle and information on movements of the vehicle (i.e., responses of the driver) in the state that the surrounding environment is changed. That is, "driving conditions" used in the present disclosure is a concept encompassing a "surrounding environment" of the vehicle, which refers to changes in location or behavior of other vehicles or pedestrians. Meanwhile, a "vehicle behavior" or a "behavior" of the vehicle, which refers responses of the driver to the surrounding environment.

For example, the actual driving data may include data, which is detected by the ADAS, indicating that a vehicle located on the side and front of the vehicle that collects data moves toward the front (i.e., the vehicle on the side and front of the reference vehicle attempts to cut in or make a lane change), data indicating whether the driver decreases or increase the speed at the corresponding time, data indicating whether the driver uses the horn or headlight, and the like.

As another example, the evaluation data may include the following data. First, a case where the vehicle reduces its speed at a predetermined rate due to the above-described surrounding environment change, for example, when another vehicle cuts in front of the vehicle is included as a recommended pattern. Then, data may be obtained by differently evaluating the degree of consideration depending on deceleration rate. The evaluation data may include the above data.

The training unit 120 receives the above-described basic data from the actual driving data storage unit 110 and the evaluation data from the evaluation data storage unit 130 and then performs training by matching the corresponding basic data with the evaluation data per driving condition. By doing so, when receiving data about a new driving condition, the training unit 120 may identify the recommended pattern closest to the corresponding driving condition, generate a recognition model for enabling to determine similarity to the identified recommended pattern, and then continuously modify the generated model through accumulated training.

Alternatively, when receiving data about a new driving condition, the training unit 120 may generate a recognition model for enabling identification of driving conditions among the previously defined/classified driving conditions correspond to or are most similar to the corresponding driving conditions.

The training through recognition models can be performed based on a machine learning scheme. To this end, the machining learning scheme may include a time series model based scheme, a big data based deep learning scheme, a rule based scheme, or any combination thereof. In this case, examples of the time series model based scheme may include an autoregressive integrated moving average scheme for explaining a change in behavior depending on time using stochastic data, a multilayer perceptron (MLP) scheme of using a nonparametric regression method as an universal approximator, etc.

In addition, examples of the deep learning based scheme may include stacked autoencoder (SAE) scheme of making input/output data be similar to each other through dimensional reduction, a recurrent neural networks (RRNs) scheme corresponding to a neural network algorithm for processing sequential information, a long short term memory (LSTM) scheme suitable for long-term training, and the like.

In addition, references for rule-based recognition can be defined as shown in Table 1 below.

TABLE 1

| Considerate driving case | Rule base recognition principles |
|---|---|
| Consideration for lane change | 1) Target vehicle in next lane/prescribed distance (Radar/Vision)<br>2) ON/OFF of turn signal of target vehicle (Vision)<br>3) Deceleration of driver's vehicle (APS/BPS/Vehicle speed)<br>4) Lane change of target vehicle (Radar/Vision) |
| Pedestrian protection | 1) Crosswalk without traffic light (Navi information)<br>2) Pedestrian on roadside (Vision)<br>3) Stop of driver's vehicle (APS/BPS/Vehicle speed)<br>4) Pedestrian walking (Vision) |
| Assistance for emergency vehicle | 1) Lane change or movement to one side of driver's vehicle (Vision)<br>2) Emergency vehicle's movement in empty space (Radar/Vision) |
| . . . | . . . |

The training unit 120 may select the basic data, which will be inputted before training. A selection process may include: 1) a process for extracting candidate input values; 2) a process for preprocessing data by integrating input signals; and 3) a process for selecting a final variable using the preprocessed candidate value.

The recognition model generated by the training process of the training unit 120 may be transmitted to the vehicle 200 through a prescribed on/offline data transmission process.

Next, the on-board phase will be described with reference to FIGS. 4 to 6.

As described above, the on-board phase refers to a step in which, after being provided with the recognition model generated by the training in the offline phase, the vehicle provides feedback of whether driving is considerate, by inputting information for identifying the surrounding environment, which is collected by the corresponding vehicle, and driver's responses to the prepared recognition model.

Figure 4:
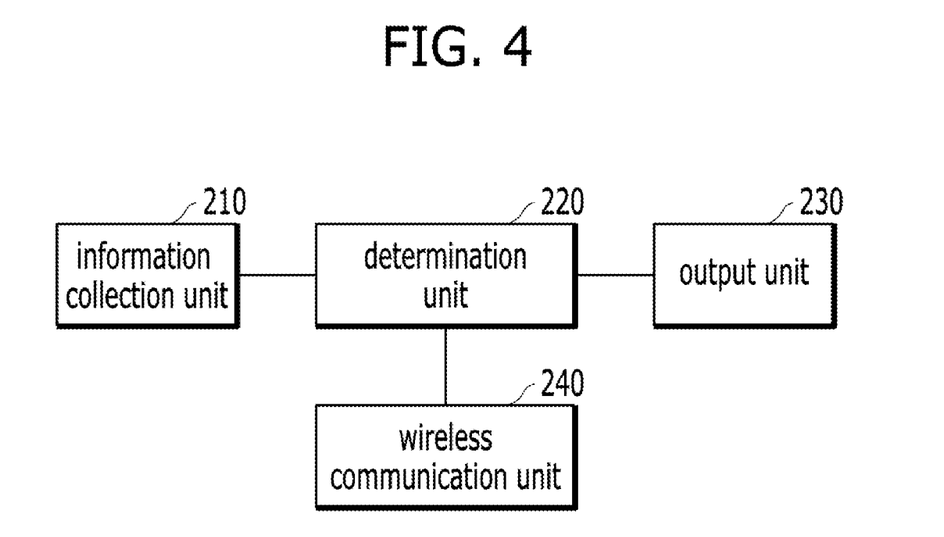
FIG. 4 illustrates an exemplary structure of a vehicle according to embodiments of the present disclosure.

FIG. 4 illustrates an exemplary structure of the vehicle according to embodiments of the present disclosure.

As shown in FIG. 4, the vehicle 200 according to embodiments of the present disclosure may include an information collection unit 210 configured to obtain information for identifying driving conditions, a determination unit 220 configured to determine whether driving is considerate by using a recognition model and a preconfigured recommended pattern, and an output unit 230 configured to provide feedback corresponding to a identification result made by the determination unit 220 to the driver, and a wireless communication unit 240 configured to transmit the identification result to the outside, receive update data for the recognition model, or exchange data with the roadside entity 500.

The information collection unit 210 collects information on the driving conditions of the vehicle 200, i.e., information on the surrounding environment and information on driver's responses thereto. To this end, the information collection unit 210 may include at least one of a navigation, a smart cruise control radar, a vision sensor for image interpretation, an accelerator pedal sensor (APS), a brake pedal sensor (BPS), and a vehicle speed sensor.

The determination unit 220 may be implemented as a computer with a memory capable for storing the recognition model and recommended pattern information and a processor for operating the recognition model. Alternatively, it may be implemented as a vehicle controller or part thereof. In addition, by applying at least one of the driving condition information obtained by the information collection unit 210 and V2X information received through the wireless communication unit 240 to the recognition model, the determination unit 220 may determine whether there is an identical or similar recommended pattern among a plurality of previously classified patterns. Moreover, the determination unit 220 may index the identification result according to a predetermined standard or processing algorithm.

In some examples, the determination unit 220 may train or modify the recognition model in real time using the machine learning scheme. Alternatively, the recognition model may be updated by an external server and then used without training. That is, when the recognition model is modified by the external server, parameters corresponding to training input values are transmitted to a telematics or cloud server, and then the recognition model is modified by the external server through training. Thereafter, the final model is transmitted to the vehicle. In addition, in another embodiment, the information for determining the driving conditions, which is obtained by the information collection unit 210, may be directly transmitted to an external remote server. Subsequently, the corresponding server may determine whether driving is considerate and then transmit the determination result to the vehicle.

The output unit 230 may include a display device capable of outputting visual information such as a cluster, an AVN monitor, heads-up display (HUD), etc. and a device capable of outputting audio information such as a speaker, etc. That is, the output unit 230 may instantly output feedback corresponding to the determination result made by the determination unit 220. For example, the visual information may include a text, an image or a combination thereof to inform that the driver is driving considerately, and the audio information may include a music, a compliment, and the like to indicate that the driver is driving considerately.

Figure 5:
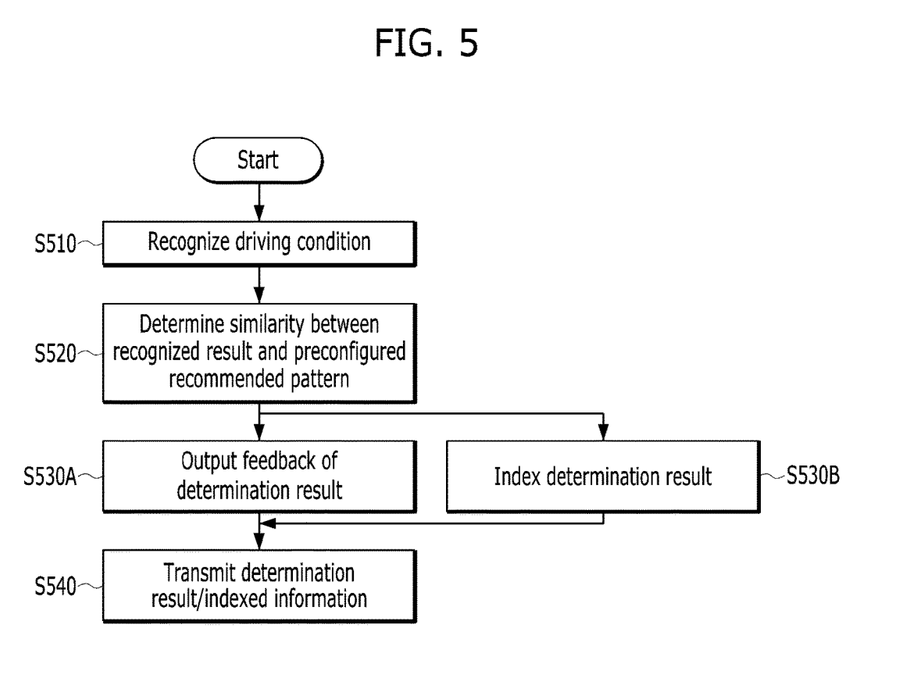
FIG. 5 illustrates an exemplary procedure in which the vehicle provides feedback based on recognized driving conditions according to embodiments of the present disclosure.

FIG. 5 is a flowchart illustrating the operation of the vehicle.

FIG. 5 illustrates an exemplary procedure in which the vehicle provides feedback based on recognized driving conditions according to embodiments of the present disclosure.

As shown in FIG. 5, the determination unit 220 can recognize driving conditions, i.e., a movement of the vehicle 200 and surrounding environment (movements of pedestrians or other vehicles) using the information collected by the information collection unit 210 [S510].

After recognizing the driving conditions, the determination unit 220 can determine similarity between the recognized result and a recommended pattern among a plurality of pre-classified patterns (i.e., whether the recognized result is similar or equal to the recommended pattern) [S520]. In other words, based on the determined similarity, the determination unit 220 may identify whether the recommended pattern similar or equal to the recognized driving conditions exists.

The output unit 230 can output feedback corresponding to the identification result [S530A]. For example, when the recommended pattern equal or similar to the recognized driving conditions exists, visual/audio type of feedback indicating that considerate driving is detected may be provided to the driver. On the other hand, when there is no recommended pattern equal or similar to the recognized driving conditions, visual/audio type of feedback that recommends to drive considerately may be outputted. Of course, when there is no recommended pattern, no feedback may be provided.

The determination unit 220 can index the information corresponding to the identification result through a prescribed calculation process [S530B]. For example, the indexing process may include a process for dividing the number of cases during a certain time period that the recognized result is determined to be similar/equal to the recommended pattern by driving distance during the corresponding time period.

The determination result information or the indexed information in the case of step S530B can be transmitted to the recognition result server 300 through the wireless communication unit 240 [S540].

When the above-described steps are performed, the driver can naturally experience that the artificial intelligence instantaneously confirms whether the driver tries to drive considerately from curiosity or goodwill to the artificial intelligence technology.

Figure 6:
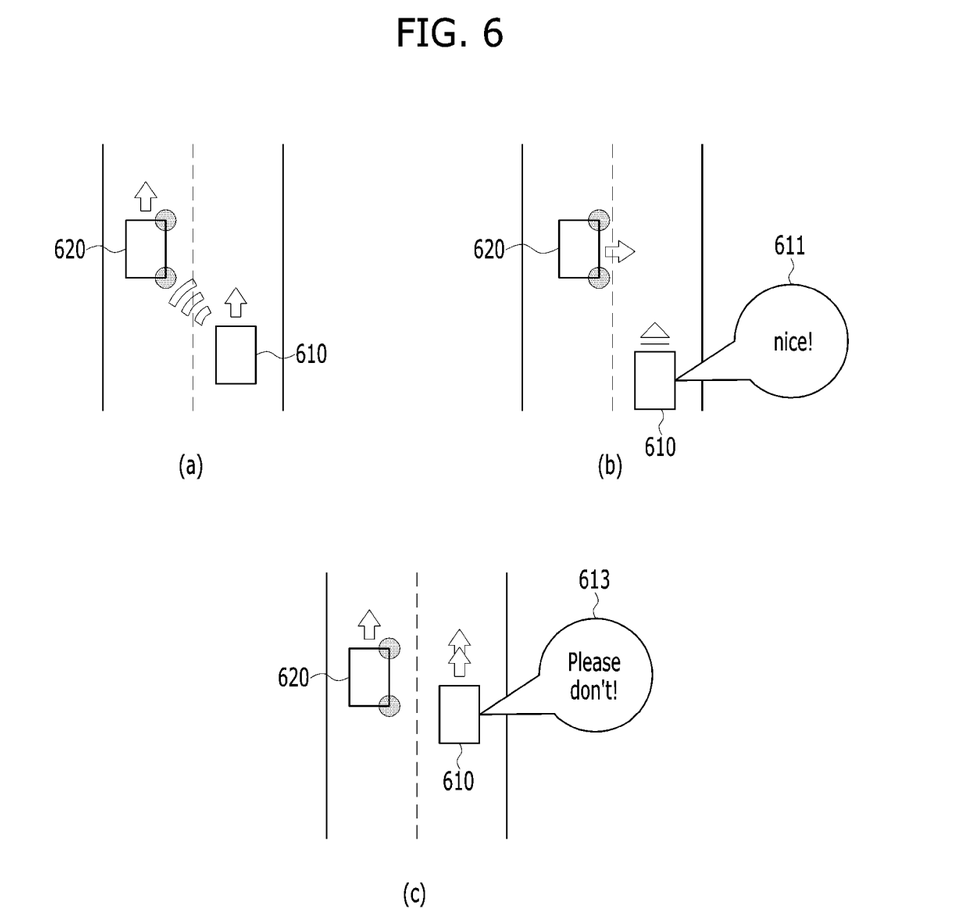
FIG. 6 is a diagram illustrating a particular method for recognizing driving conditions and providing feedback based on the recognized driving conditions according to embodiments of the present disclosure.

FIG. 6 is a diagram illustrating a particular method for recognizing driving conditions and providing feedback based on the recognized driving conditions according to embodiments of the present disclosure. In FIG. 6, it is assumed that on a one-way two-lane road, a driver's vehicle 610 is driving on the right lane, and a different vehicle 620 is driving on the left lane in front of the driver's vehicle 610. Hereinafter, for convenience of description, the driver's vehicle 610 is referred to as "the present vehicle", and the different vehicle 620 is referred to as "the other vehicle".

As shown in section (a) of FIG. 6, when the other vehicle 620 attempts to change its lane to the lane of the present vehicle 610 while turning on the right turn signal, the present vehicle 610 can recognize this attempt through the information collection unit 210.

In this case, if the driver of the present vehicle 610 decelerates by pressing a brake pedal as shown in FIG. 6 (b), the determination unit of the present vehicle may determine that such driving conditions correspond to a recommended pattern and then output positive feedback 611.

Section (b) of FIG. 6, if the driver of the present vehicle 610 accelerates as shown in FIG. 6 (c), the determination unit of the present vehicle 210 may determine that there is no recommended pattern similar or equal to such driving conditions or that the driving conditions are matched with a pattern of which the degree of recommendation is lower than a predetermined value. Then, the determination unit may output negative feedback 613.

Next, the online phase will be described in detail with reference to FIGS. 7 and 8.

The online phase means a step in which information stored in the recognition result server 300 is provided to the online service entity 400 allowed by the driver in order to provide various additional services.

Figure 7:
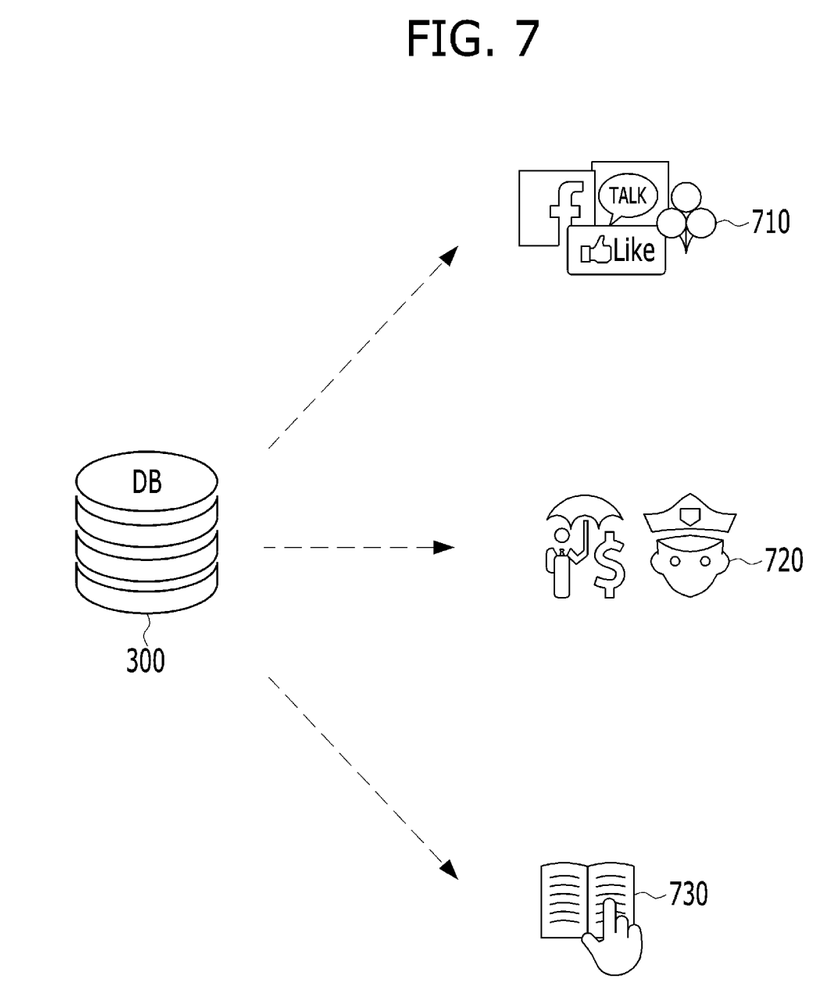
FIG. 7 is a diagram for explaining the concept of services that can be provided in an online phase according to embodiments of the present disclosure.
Figure 8:
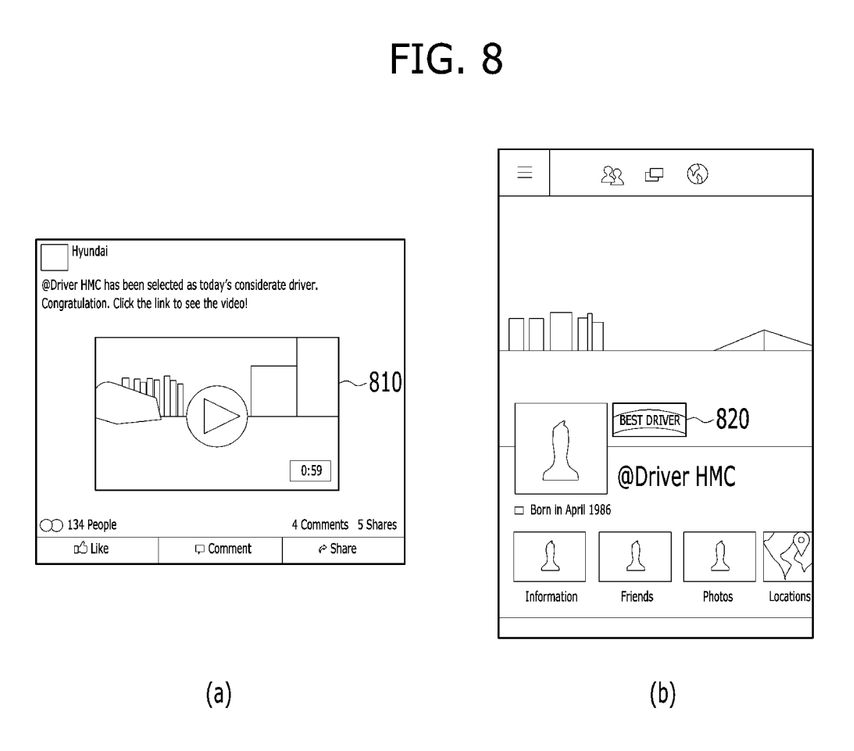
FIG. 8 illustrates particular examples of SNS related services according to embodiments of the present disclosure.

FIG. 7 is a diagram for explaining the concept of services that can be provided in an online phase according to embodiments of the present disclosure, and FIG. 8 illustrates particular examples of SNS related services according to embodiments of the present disclosure.

As shown in FIG. 7, the services that can be provided in the online phase may include an SNS related service 710, an insurance/administration service 720, and a manual distribution service 730, etc.

Specifically, to inspire the pride of considerate driving, dedicated points or marks may be provided to considerate drivers, or postings thereof may be provided through interworking with the SNS 710. For example, as shown in section (a) FIG. 8 (a), a posting that introduces a driver with a high degree of consideration may be provided through a specific SNS account. In this case, information on a driver's indexed consideration score, a driver's SNS ID, a video image obtained through a vision sensor, and the like may be included, and such information can be included in the posting only when the driver agrees with that.

As another example, as shown in FIG. 8, only when the indexed consideration score is equal to or higher than a predetermined score, the SNS may be designed to allow that a specific mark 820 is provided on the introduction page of the driver's SNS account.

In addition, in the case of the insurance/administration service 720, if the indexed consideration score is provided to an insurance company, it is expected that an insurance premium will be lowered. If the indexed consideration score is provided to administrative office, benefits such as reduction in penalty or fine, which was or will be issued, can also be expected.

Moreover, in the case of the manual distribution service 730, a manual for improving consideration/yield in driving can be distributed through a vehicle AVN system or smartphone application in order to provide more training opportunities for correct driving attitudes. In particular, the manual distribution service 730 may be provided in the on-board phase to a driver who has the frequency of considerate driving equal to or smaller than a predetermined level. In this case, the manual distribution service may be provided with a guide for correcting the driving attitudes different from the recommended patterns. For example, in the situation shown in section (a) of FIG. 6, if the driving pattern shown in section (c) of FIG. 6 is frequently recognized, an AVN (audio/video/navigation) terminal in the vehicle or a terminal carried by the driver (i.e., terminal registered in the driver's name) may be configured to output guide information on consideration for another vehicle's cut-in or lane change. Of course, this manual provision process should not be necessarily performed in the online phase. For example, the manual provision process may be performed in the on-board phase according to the identification of the vehicle.

According to the aforementioned embodiments, a wide range of benefits can be provided to vehicle drivers, and the reputation of a company that sells a vehicle where the above-described system is installed can be improved as well. For example, from the perspective of the driver, it is expected since technical curiosity may lead to participation in considerate driving, the traffic culture will be improved. In addition, it is possible to not only provide social recognition (e.g., SNS) about personal consideration (personality) but also expect additional benefits such as an insurance premium discount, penalty reduction, etc. Moreover, from the perspective of the company, there are advantages in that the company shares social responsibility and liability, that is, contributes to the improvement of the traffic culture as the car company, obtains the reputation that major customers of the company are considerate drivers, and publicizes that the company utilizes AI controversial in terms of ethics and job.

Further, it is expected that the embodiments of the present disclosure can be developed to the intelligent driving assistance technology (i.e., considerate/thoughtful driving can be extended to defensive/law-abiding driving) based on autonomous driving essential technology. Additionally, the embodiments also has advantages in that when there are positive social responses, they can be developed to the standard technology/regulations.

The above-described disclosure can be implemented in a program-recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy disks, optical data storage devices, and the like.

Therefore, the above embodiments are to be construed in all aspects as illustrative and not restrictive. The scope of the present disclosure should be determined by reasonable interpretation of the appended claims. In addition, the present disclosure covers the modifications and variations of this disclosure that come within the scope of the appended claims and their equivalents.

What is claimed is:

1. A method for providing driving guidance in a vehicle, the method comprising:
    recognizing, by a vehicle controller, driving conditions relating to a surrounding environment of the vehicle and a behavior of the vehicle using information obtained via one or more of a sensor and an electronic device;
    identifying, by the vehicle controller, a recommended pattern corresponding to the recognized driving conditions from among a plurality of previously classified patterns;
    outputting, by the vehicle controller, feedback information corresponding to the identified recommended pattern; and
    transmitting, by the vehicle controller, information relating to the identified recommended pattern,
    wherein the driving conditions relating to the surrounding environment includes a behavior of at least one other vehicle located in a vicinity of the vehicle and a behavior of a pedestrian located in the vicinity of the vehicle, and
    wherein the identifying of the recommended pattern comprises identifying the recommended pattern based on whether there is action of protecting a nearby vehicle or pedestrian.

2. The method of claim 1, wherein the sensor is provided in the vehicle or in the at least one other vehicle, and the electronic device belongs to the pedestrian.

3. The method of claim 1, wherein the identifying of the recommended pattern further comprises identifying the recommended pattern based on at least one of traffic regulations and whether there is action of promoting safety of the vehicle, the at least one other vehicle, and the pedestrian.

4. The method of claim 1, wherein the identifying of the recommended pattern comprises determining whether there is a recommended pattern identical or similar to the recognized driving conditions.

5. The method of claim 4, further comprising, after the determining of whether there is the identical or similar recommended pattern, generating indexed information indicating a degree of considerate driving based on a number of cases in which the identical or similar recommended pattern is present.

6. The method of claim 5, wherein:
    the transmitting of the information relating to the identified recommended pattern comprises transmitting the indexed information, and
    the generating of the indexed information comprises dividing a number of cases accumulated during a particular time period according to accumulated driving distance during the particular time period.

7. The method of claim 1, further comprising:
    storing the information relating to the identified recommended pattern in a remote storage device; and
    granting a service provider access to browse the stored information relating to the identified recommended pattern.

8. The method of claim 7, wherein a service provided by the service provider includes at least one of an action of allowing other people to recognize the information relating to the identified recommended pattern by posting information online, an action of using the information relating to the identified recommended pattern as a basis for calculating an insurance premium of the vehicle, and an action of using the information relating to the identified recommended pattern in post-processing traffic violations committed by the driver.

9. The method of claim 4, further comprising, after the identifying of whether there is the identical or similar recommended pattern, providing an improvement guide based on a number or a frequency of cases in which the identical or similar recommended pattern is not present.

10. The method of claim 9, further comprising outputting the improvement guide via a terminal provided in the vehicle or a terminal belonging to a driver of the vehicle.

11. A system for providing driving guidance in a vehicle, the system comprising:
    a vehicle equipped with a vehicle controller configured to recognize driving conditions relating to a surrounding environment of the vehicle and a behavior of the vehicle using information obtained via one or more of a sensor and an electronic device, identify a recommended pattern corresponding to the recognized driving conditions from among a plurality of previously classified patterns, and output feedback information corresponding to the identified recommended pattern; and
    a server configured to receive information relating to the identified recommended pattern from the vehicle and store the received information,
    wherein the driving conditions relating to the surrounding environment includes a behavior of at least one other vehicle located in a vicinity of the vehicle and a behavior of a pedestrian located in the vicinity of the vehicle, and
    wherein the controller is configured to identify the recommended pattern based on whether there is action of protecting a nearby vehicle or pedestrian.

12. The system of claim 11, wherein the sensor is provided in the vehicle or in the at least one other vehicle, and the electronic device belongs to the pedestrian.

13. The system of claim 11, wherein the vehicle controller is further configured to identify the recommended pattern is-based on at least one of traffic regulations and whether there is action of promoting safety of the vehicle, the at least one other vehicle, and the pedestrian.

14. The system of claim 11, wherein the vehicle controller is further configured to determine whether there is a recommended pattern identical or similar to the recognized driving conditions.

15. The system of claim 14, wherein the vehicle controller is further configured to, after the determining of whether there is the identical or similar the recommended pattern, generate indexed information indicating a degree of considerate driving based on a number of cases in which the identical or similar recommended pattern is present.

16. The system of claim 11, further comprising an online service entity configured to post the information relating to the identified recommended pattern on the server when a driver grants access to the information relating to the identified recommended pattern.

17. The system of claim 16, wherein a service provided by the online service entity includes at least one of an action of allowing other people to recognize the information relating to the identified recommended pattern by posting information online, an action of using the information relating to the identified recommended pattern as a basis for calculating an insurance premium of the vehicle, and an action of using the information relating to the identified recommended pattern in post-processing traffic violations committed by the driver.

18. A vehicle for providing driving guidance, the vehicle comprising:
- an information recognition unit configured to obtain information relating to a surrounding environment of the vehicle and a behavior of the vehicle using information obtained via one or more of a sensor and an electronic device;
- a determination unit configured to recognize driving conditions using the information obtained by the information recognition unit and identify a recommended pattern corresponding to the recognized driving conditions from among a plurality of previously classified patterns;
- an output unit configured to output feedback information corresponding to the identified recommended pattern; and
- a wireless communication unit configured to transmit information relating to the identified recommended pattern,
- wherein the driving conditions relating to the surrounding environment includes a behavior of at least one other vehicle located in a vicinity of the vehicle and a behavior of a pedestrian located in the vicinity of the vehicle, and
- wherein the determination unit further configured to identify the recommended pattern based on whether there is action of protecting a nearby vehicle or pedestrian.

* * * * *